United States Patent
Costea et al.

(10) Patent No.: US 7,730,141 B2
(45) Date of Patent: Jun. 1, 2010

(54) GRAPHICAL INTERFACE FOR DEFINING MUTUALLY EXCLUSIVE DESTINATIONS

(75) Inventors: Mihai Costea, Redmond, WA (US); Patrick M. Baudisch, Seattle, WA (US); Aidan M. Delaney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1142 days.

(21) Appl. No.: 11/303,523

(22) Filed: Dec. 16, 2005

(65) Prior Publication Data

US 2007/0143411 A1    Jun. 21, 2007

(51) Int. Cl.
  G06F 15/16    (2006.01)
  G06F 15/173    (2006.01)
  G06F 3/048    (2006.01)
(52) U.S. Cl. .................. 709/206; 709/203; 709/204; 709/217; 709/223; 715/764; 715/780
(58) Field of Classification Search .................. 709/206
  See application file for complete search history.

(56) References Cited

U.S. PATENT DOCUMENTS

| | | | |
|---|---|---|---|
| 5,877,758 A * | 3/1999 | Seybold .................. | 715/866 |
| 6,512,530 B1 | 1/2003 | Rzepkowski et al. | |
| 6,725,228 B1 * | 4/2004 | Clark et al. .................. | 707/102 |
| 6,778,643 B1 | 8/2004 | Bushey et al. | |
| 6,779,021 B1 | 8/2004 | Bates et al. | |
| 7,007,067 B1 * | 2/2006 | Azvine et al. .............. | 709/206 |
| 7,027,463 B2 * | 4/2006 | Mathew et al. .............. | 370/463 |
| 7,051,277 B2 * | 5/2006 | Kephart et al. .............. | 715/229 |
| 7,206,814 B2 * | 4/2007 | Kirsch ......................... | 709/206 |
| 7,299,261 B1 | 11/2007 | Oliver et al. | |
| 7,516,182 B2 | 4/2009 | Goldman | |
| 7,546,348 B2 | 6/2009 | Wilson et al. | |
| 7,571,220 B1 | 8/2009 | Ng | |
| 2001/0042087 A1 * | 11/2001 | Kephart et al. .............. | 707/530 |
| 2002/0054144 A1 * | 5/2002 | Morris-Yates ............... | 345/809 |

(Continued)

FOREIGN PATENT DOCUMENTS

GB    2366706 A    3/2002

(Continued)

OTHER PUBLICATIONS

Unknown, "How the Web-Based Email Spam Filter Works—A Primer," printed from http://email.secureserver.net/primer/, printed on Dec. 15, 2005, 2 pages, U.S.A.

(Continued)

*Primary Examiner*—Jeffrey Pwu
*Assistant Examiner*—Willow Noonan
(74) *Attorney, Agent, or Firm*—Senniger Powers LLP

(57) ABSTRACT

A user defines mutually exclusive inbox and spam folders to which emails are routed based on a rating assigned to each email. A variable user-defined range defines a mapping of the ratings to each folder. Incoming emails are routing to one of the folders according to the range. A reference set of emails is designated, each having a rating and either an inbox label or a spam label. A display indicates the number the reference emails in each folder if the reference emails are routed to one of the folders according to their ratings and according to the user-defined range.

17 Claims, 5 Drawing Sheets

U.S. PATENT DOCUMENTS

| | | | |
|---|---|---|---|
| 2003/0105827 A1* | 6/2003 | Tan et al. | 709/206 |
| 2003/0212680 A1* | 11/2003 | Bates et al. | 707/7 |
| 2004/0021695 A1 | 2/2004 | Sauermann et al. | |
| 2004/0024646 A1* | 2/2004 | Iry et al. | 705/26 |
| 2004/0039786 A1* | 2/2004 | Horvitz et al. | 709/207 |
| 2004/0104911 A1 | 6/2004 | Brody et al. | |
| 2004/0139165 A1 | 7/2004 | McMillan et al. | |
| 2005/0033810 A1* | 2/2005 | Malcolm | 709/206 |
| 2005/0044154 A1 | 2/2005 | Kaminski et al. | |
| 2005/0080642 A1 | 4/2005 | Daniell | |
| 2005/0080855 A1* | 4/2005 | Murray | 709/206 |
| 2005/0091320 A1* | 4/2005 | Kirsch et al. | 709/206 |
| 2005/0169274 A1 | 8/2005 | Shuster | |
| 2005/0198159 A1* | 9/2005 | Kirsch | 709/206 |
| 2005/0204006 A1* | 9/2005 | Purcell et al. | 709/206 |
| 2005/0216935 A1* | 9/2005 | Nishikawa et al. | 725/37 |
| 2005/0251331 A1* | 11/2005 | Kreft | 701/207 |
| 2006/0036701 A1 | 2/2006 | Bulfer et al. | |
| 2006/0080677 A1* | 4/2006 | Louie | 719/323 |
| 2006/0088202 A1* | 4/2006 | Venkatachalam | 382/152 |
| 2006/0095521 A1* | 5/2006 | Patinkin | 709/206 |
| 2006/0107211 A1* | 5/2006 | Mirtich et al. | 715/700 |
| 2006/0161423 A1* | 7/2006 | Scott et al. | 704/10 |
| 2006/0168046 A1* | 7/2006 | Qureshi | 709/206 |
| 2006/0168059 A1* | 7/2006 | Chang et al. | 709/206 |
| 2006/0265498 A1* | 11/2006 | Turgeman et al. | 709/225 |
| 2006/0294035 A1* | 12/2006 | Siegel et al. | 706/45 |
| 2007/0038705 A1* | 2/2007 | Chickering et al. | 709/206 |
| 2007/0094390 A1* | 4/2007 | Nussey | 709/225 |
| 2007/0168430 A1* | 7/2007 | Brun et al. | 709/206 |

FOREIGN PATENT DOCUMENTS

| | | |
|---|---|---|
| JP | 2001-326691 A | 11/2001 |
| KR | 1020010092554 A | 10/2001 |
| KR | 20030078979 A | 10/2003 |
| KR | 1020040079667 A | 9/2004 |
| KR | 1020040091656 A | 10/2004 |
| WO | WO 00/49776 A1 | 8/2000 |
| WO | 03010680 A1 | 2/2003 |
| WO | 03054764 A1 | 7/2003 |

OTHER PUBLICATIONS

Unknown, "Barracuda Networks," "Spam Filter," printed from http://www.barracudanetworks.com/ns/products/spam_features.php, 2005, 3 pages, Barracuda Networks, U.S.A.

Unknown, "Spam Filter with Web Browser Interface," printed from http://www.spamai.com/, 2005, 3 pages, DAIR Computer Systems, U.S.A.

* cited by examiner

GRAPHICAL INTERFACE FOR DEFINING MUTUALLY EXCLUSIVE DESTINATIONS

BACKGROUND

As more companies and individuals rely on email systems to communicate, there has been a rapid increase in spam and other undesirable email messages. Spam email messages are unsolicited email messages that are not of interest to the recipient, usually sent to many recipients at one time. Examples of undesirable email messages include computer viruses, programs or piece of computer code that is loaded onto a user's computer without the user's knowledge and runs against the user's wishes; phishing attacks, where an e-mail is sent to a user falsely claiming to be an established legitimate enterprise in an attempt to scam the user into surrendering private information that will be used for identity theft; and pharming attacks where an email is sent requesting the user to visit a web site which appear legitimate, but the user is actually redirected to a web site where the user is encouraged to surrender private information that will be used for identity theft. Accordingly, methods have been developed to detect spam and other undesirable emails before they reach a user.

In one of the models in use today, an underlying classification engine maps each email to a value on a proprietary ordinal scale. In such prior models, the scale offers a finite number of buckets. To actually filter email, each value of that scale is mapped to an output device, such as inbox, junk email folder on the client side, junk email folder on the server side (also called quarantine folder), and recycle bin. When using the scale, emails with low scores are to be mapped to the inbox and emails with high scores to one of the three spam containers.

But, spam filtering is not an exact science. Mapping emails with middle scores is a matter of tradeoffs. Directing more email scores to the spam destinations will reduce the amount of spam that will reach the user, yet it will also filter out additional emails that should have reached the user. The table below illustrates the tradeoff.

|  | Email is valid | Email is spam |
| --- | --- | --- |
| Email considered valid (and sent to inbox) | Good | Spam in inbox |
| Email considered spam (and filtered out) | Valid email filtered out | Good |

SUMMARY

In one embodiment, a method is provided for assisting the user in defining mutually exclusive destinations. Incoming objects are rated and then routed to one of the destinations based on the assigned rating and a variable user-defined range. The user-defined range defines a mapping of the ratings to each destination.

In another embodiment, a method provided for assisting the user in defining mutually exclusive folders. Incoming emails are rated and then routed to one of the folders based on the assigned rating and a variable user-defined range. The user-defined range defines a mapping of the ratings to each folder.

In another embodiment, the user interface includes a reference set of emails. Each reference email has been assigned rating and a label. The interface allows a user to define a variable range which defines a mapping of the ratings to each folder. The user interface displays the number of reference emails routed to each folder according to the defined range and the assigned rating. The display also indicates the number of reference emails routed to each folder having a label corresponding to that folder and the number of reference emails having a label that does not correspond to that folder.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
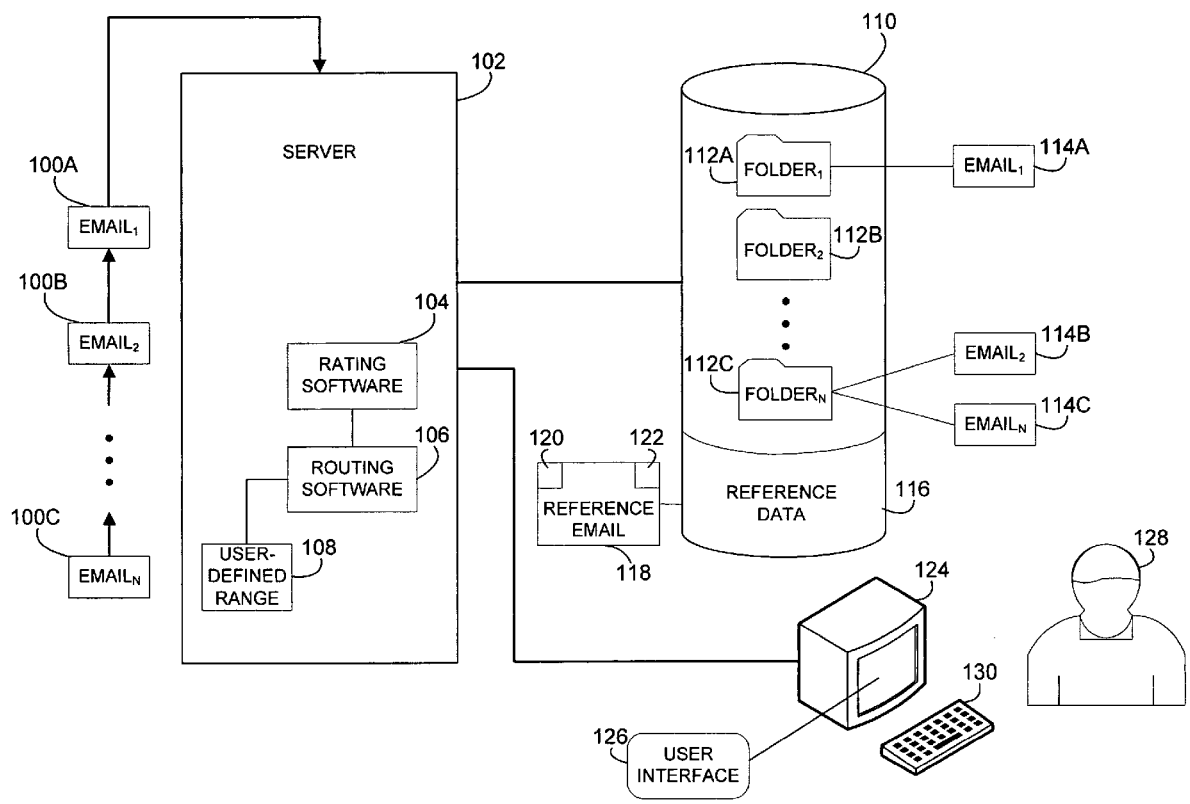
FIG. 1 is a block diagram illustrating one exemplary embodiment of the invention in a suitable computing system.

FIG. 1 is a block diagram illustrating one exemplary embodiment of a suitable computing system. Each incoming email 100 received by a server 102 is assigned a rating by a rating software 104. The rating assigned to a particular incoming email 100 indicates a probability that the particular incoming email 100 contains spam. In other embodiments, the rating indicates a probability that the incoming email 100 contains a virus, phishing attack, pharming attack or some other characteristic. The rating can be on an ordinal or on a continuous scale. In one embodiment, a high rating indicates a high probability that the incoming email 100 contains spam.

A variable user-defined range 108 maps each of the ratings to one of a plurality of folders 112. For example, if the ratings are integers of 1 to 9, rating 1 could be mapped to folder 112A, rating 2 to folder 112B, and so on with rating 9 mapped to folder 112I. Each incoming email 100 is routed to one of the folders 112 on a data store 110 by a routing software 106 according to the assigned rating of the incoming email 100 and the user-defined range 108.

The user-defined range 108 may be modified by a user 128 accessing a user interface 126 displayed on a monitor 124 and the user may modify the user-defined range 108 via an input device 130 (e.g., a keyboard). In one embodiment, the range 108 is a contiguous set of ratings. For example, if the ratings are integers of 1 to 9, the range 108 could be defined as mapping ratings 1 to 4 to folder 112A and ratings 5 to 9 to folder 112B. In another embodiment, the range 108 is set of ratings where the first set of rating is noncontiguous with a second set of ratings. For example, if the ratings are integers of 1 to 9, the range 108 could be defined as mapping ratings 1 to 4 and rating 6 to folder 112A and the rating 5 and ratings 7 to 9 to folder 112B.

Because each incoming email 100 is routed to one of the folders 112 according to the assigned rating of the incoming email and the user-defined range 108, the user 128 can define a mapping which results in each of folders 112 containing a desired level of a specific type of email. For example, in an embodiment where a high rating indicates a high probability that an email contains spam, emails with high ratings can be routed to a Deleted Items folder and emails with a low rating can be mapped to an Inbox folder. To accomplish this, the user-defined range 108 specified by the user 128 would map high ratings to the Deleted Items folder and low ratings to the Inbox folder. In general, any incoming email 100 can be routed to a particular folder 112 based on its rating. For example, in other embodiments, incoming emails 100 may be routed to a Junk email folder or a Quarantine folder.

In one embodiment, the data store 110 also includes reference data 116 comprising of reference emails 118 which are emails that approximate the incoming email stream 100 of the server 102. For example, the reference emails 118 may be sampled from the incoming email stream 100. In another embodiment, the reference emails are not stored in the data store 100. Alternatively, the reference emails 118 may be stored in a separate memory or only statistical data generated from the reference emails 118 is stored.

Each reference email 118 is assigned a rating 122 by the rating software. The rating 122 indicates a probability that the reference email 118 contains spam. As noted above, in other embodiments, the rating may indicate a probability that the reference email contains a virus, phishing attack, pharming attack or some other characteristic. As noted above, the rating 122 of the reference email can be on an ordinal or on a continuous scale.

Each reference email 118 is also assigned a label 120 by the user 128. The user-defined label 120 relates to one of the folders 112 which corresponds to the content of the email, according to the user 128. For example, in one embodiment, the user 128 inspects the reference email 118 for spam and assigns a user-defined label 120 to the reference email 118 based on the inspection. If the user 128 concludes by inspection that a particular reference email 118 contains spam, the user 128 would assign a "spam" label to the particular email indicating that, according to the user 128, the reference email 118 should be routed to the Deleted Items folder. Similarly, if the user 128 concludes by inspection that a particular reference email 118 does not contain spam, the user 128 would assign an "valid" label to the particular reference email 118 indicating that, according to the user 128, the reference email 118 should be routed to the Inbox folder.

The user 128 employs the user interface 126 to indicate and/or modify the user-defined range 108. In response to the user 128 defining or modifying a range 108 and thus defining or redefining a mapping, the defined mapping is applied to the reference emails 118 to determine which folder 112 each reference email 118 would be routed to according to the defined mapping. The user interface 126 presents a display indicating the number of reference emails 118 which would be routed to each of the folders 112 according to their ratings 122 and the user-defined/modified range 108. The display includes an indication the total number of reference emails 118 in each folder 112. Further, for each folder 112, the user interface 126 indicates the number of reference emails 118 containing the user-defined label 120 corresponding to the folder 112 and the number of reference emails 118 containing one of the user-defined labels 120 which does not correspond to the folder 112. Since the user interface 126 creates the display as if the reference emails 118 were routed to the folders 112 according to their rating 122 and the user-defined range 108, the user 128 can manipulate the user-defined range 108 in the user interface 126 and observe the impact on the content of the folders 112 before the user-defined range 108 is applied to new incoming emails 100.

Figure 2:
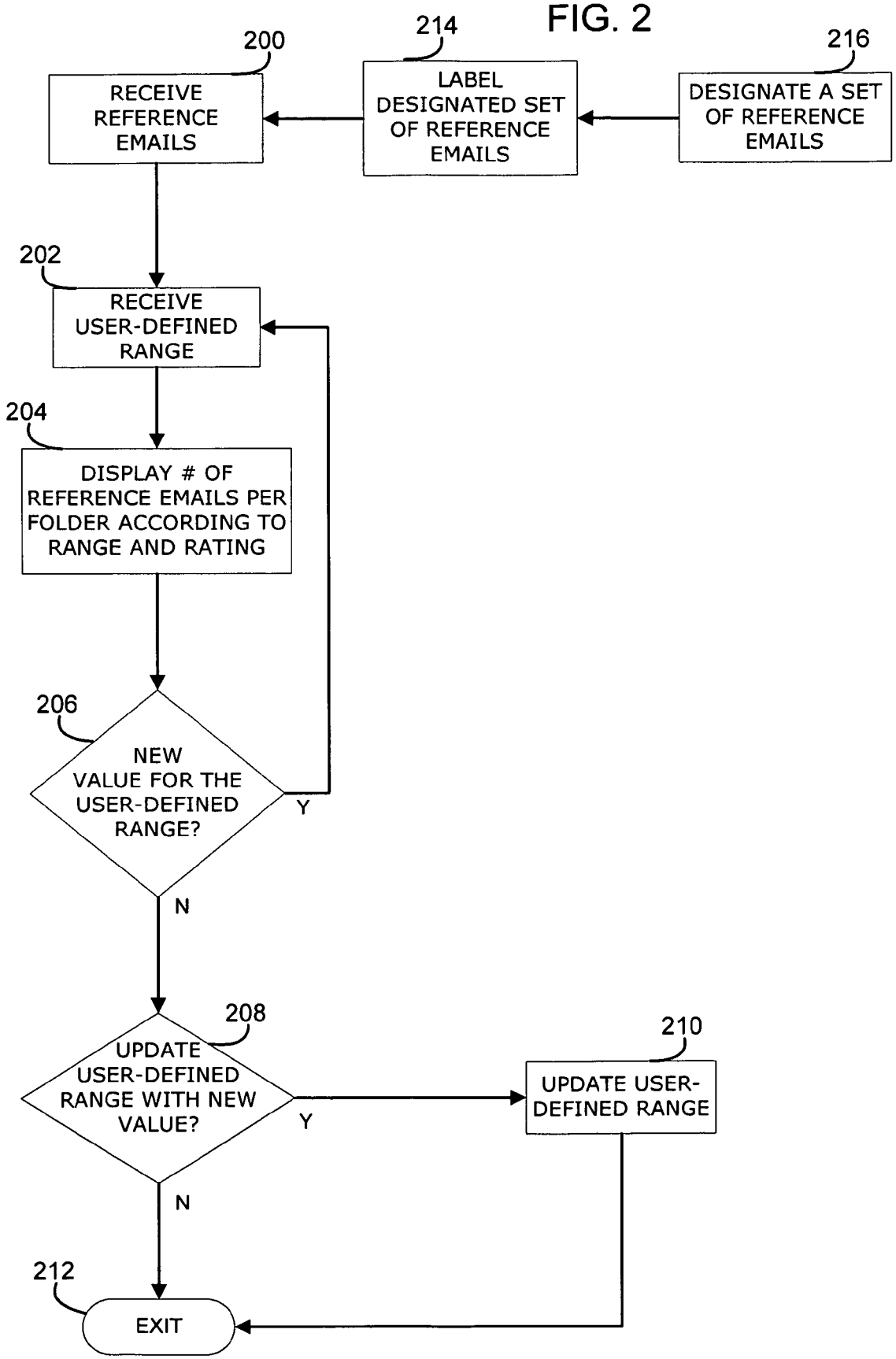
FIG. 2 is an exemplary flow chart of a method of defining mutually exclusive destinations of one embodiment of the invention.

In operation, for example, a system may have two folders, an Inbox folder and a Deleted Items folder. As shown in FIG. 2, at 216, the example system includes reference data comprising 9 reference emails, rated from 1 to 9, 9 indicating a high probability that the email is spam. The rating software 104 rated reference email 1, rated reference email 2, and so on with reference email 9 rated 9. At 214, reference emails 1 to 5 have a user-defined label of "valid" and reference emails 6 to 9 have a user-defined label of "spam". At 200, the nine reference emails are received by the user interface (UI) 126. The following table summarizes the reference emails data:

|                    | Rating | Label |
|--------------------|--------|-------|
| Reference Email 1  | 1      | valid |
| Reference Email 2  | 2      | valid |
| Reference Email 3  | 3      | valid |
| Reference Email 4  | 4      | valid |
| Reference Email 5  | 5      | valid |
| Reference Email 6  | 6      | spam  |
| Reference Email 7  | 7      | spam  |
| Reference Email 8  | 8      | spam  |
| Reference Email 9  | 9      | spam  |

Next, shown at 202, the user-defined range is received by the UI. In the example system, the user-defined range maps ratings 1 to 3 to the Inbox folder and ratings 4 to 9 to the Deleted Items folder.

Figure 3:
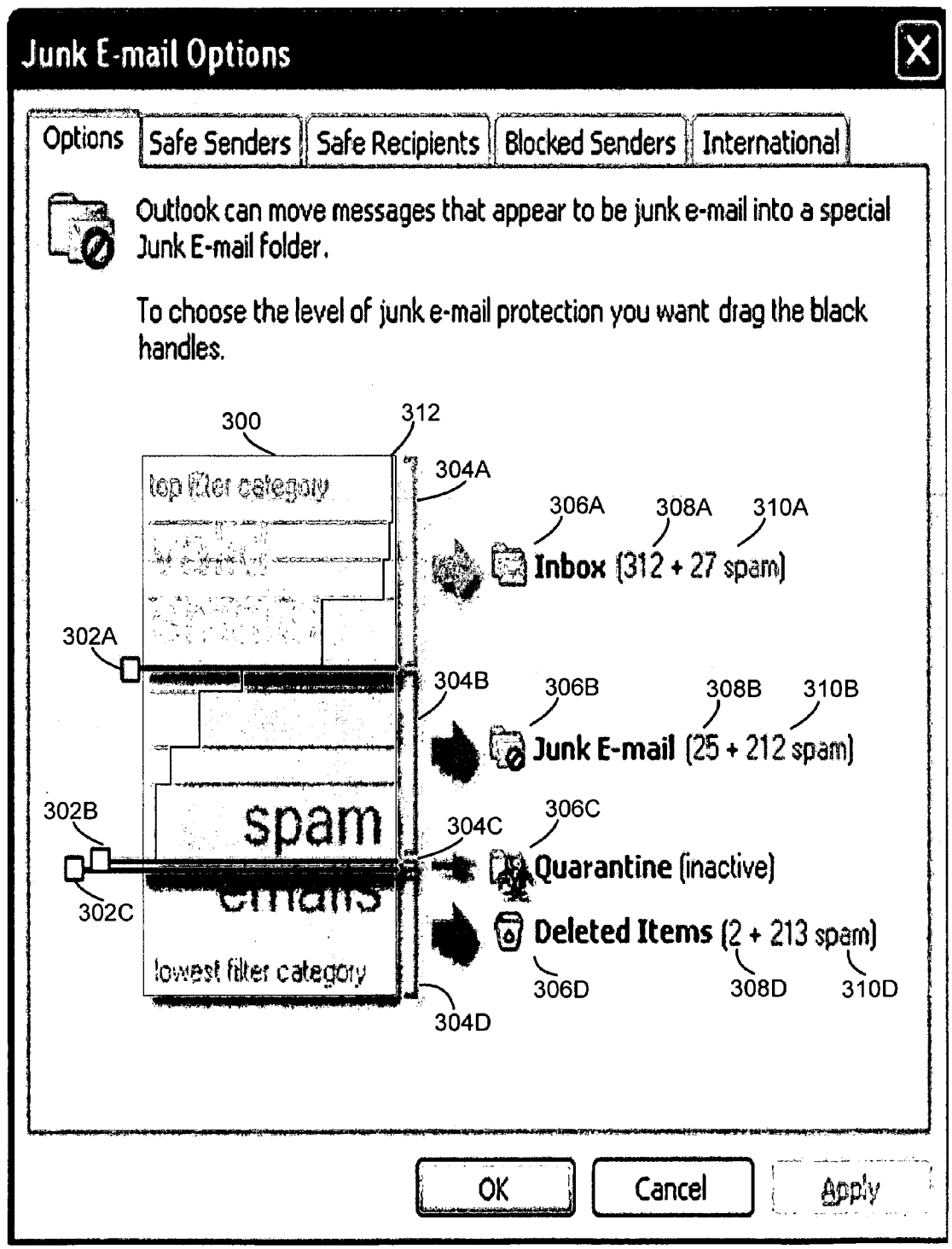
FIG. 3 is an exemplary embodiment of the invention of a slider-based user interface where documents are rated with an ordinal scale.
Figure 4:
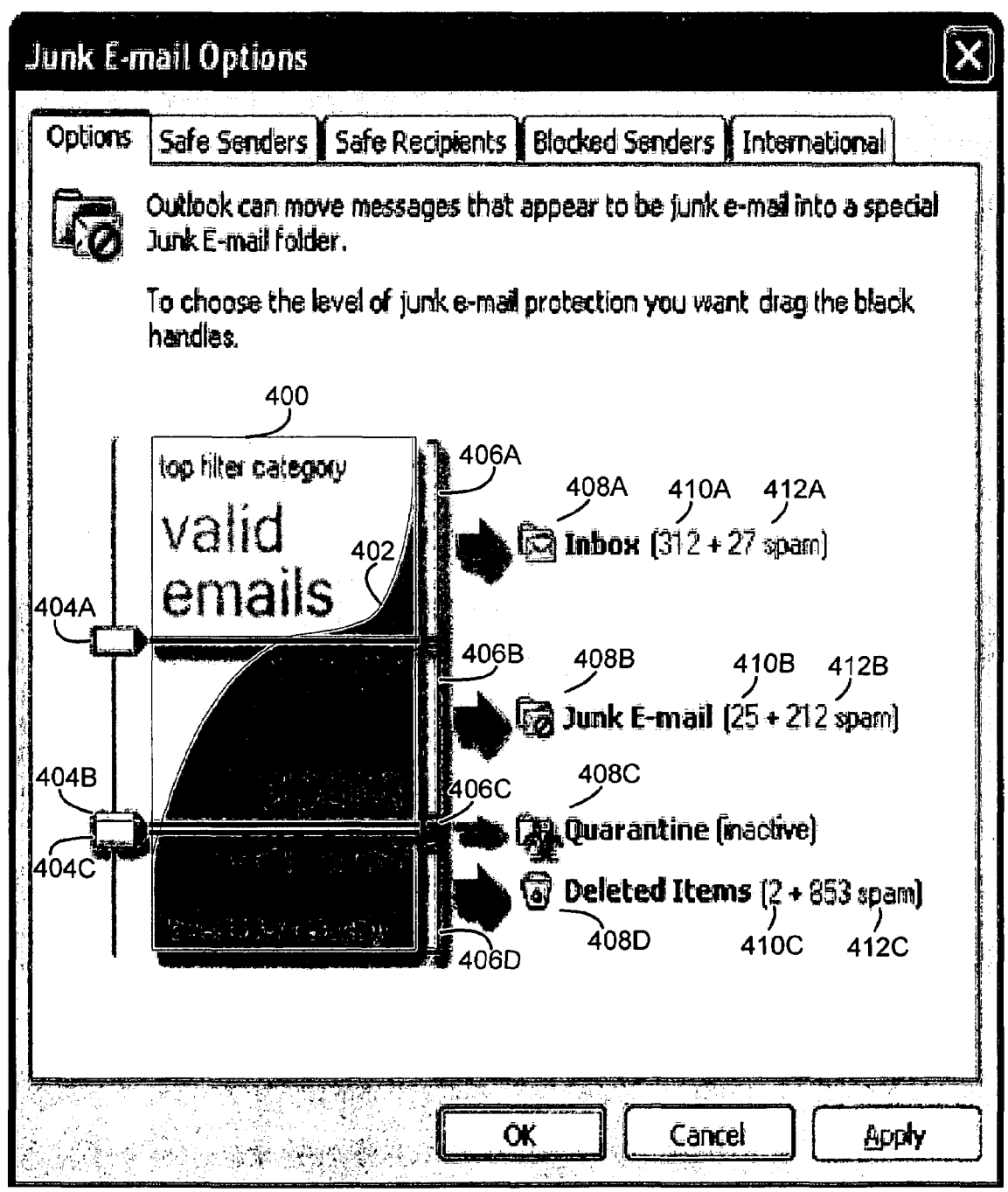
FIG. 4 is an exemplary embodiment of the invention of a slider-based user interface where documents are rated with a continuous scale.
Figure 5:
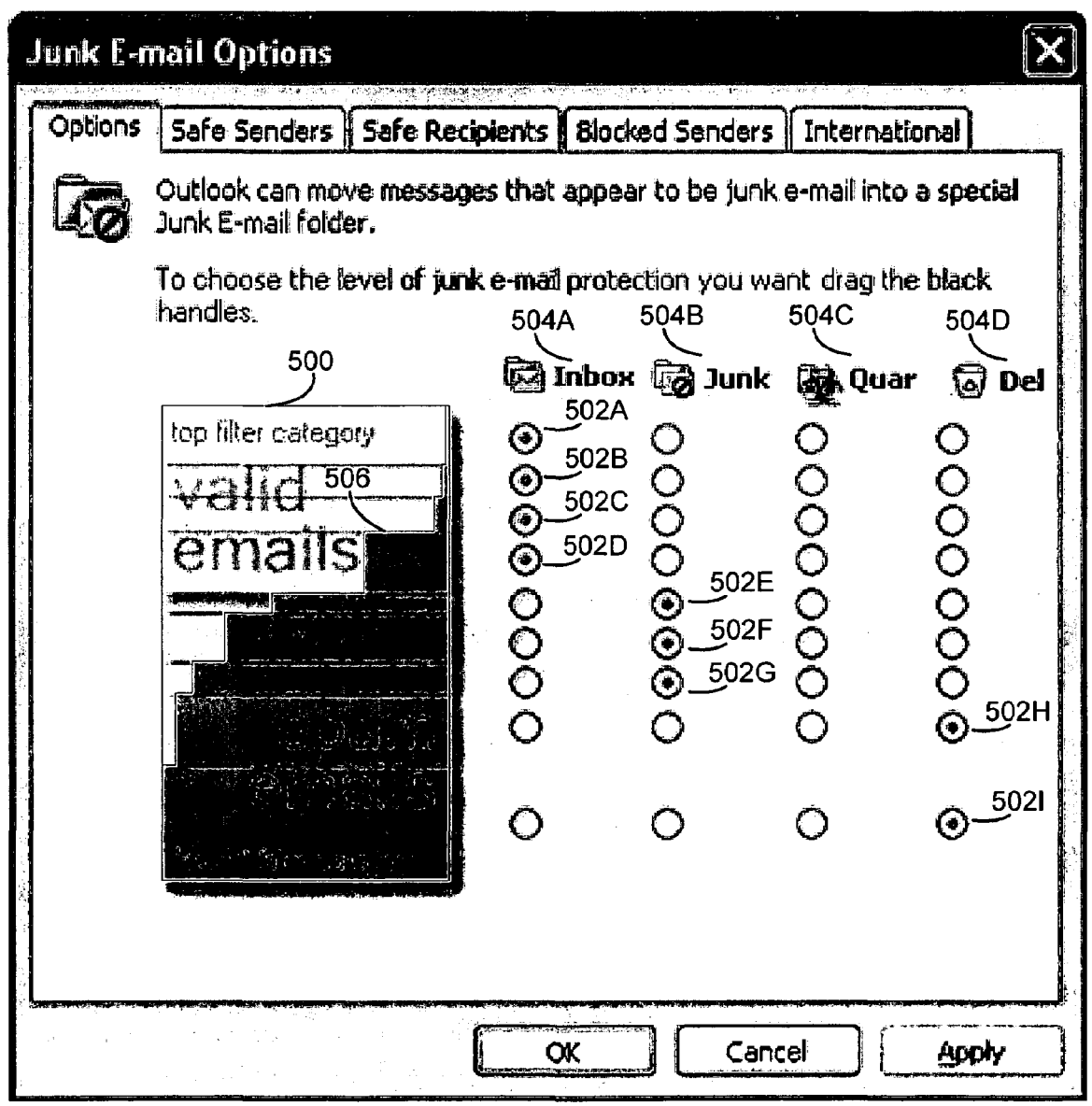
FIG. 5 is an exemplary embodiment of the invention of a radio-button-based user interface where documents are rated with using an ordinal scale.

At 204, the UI creates a display as if the reference mails 118 are routed according to their rating and according to the user-defined range 108. Thus, the example UI will create a display indicating that 3 reference emails are routed to the Inbox folder and 6 reference emails are routed to the Deleted Items folder. Additionally, the example display will indicate that 3 reference emails labeled "valid" routed to the Inbox folder and no reference emails labeled "spam" routed to the Inbox folder; and, 2 reference emails labeled "valid" routed to the Deleted Items folder and 4 reference emails labeled "spam" routed to the Deleted Items folder. Two slider-based embodiments of the UI are shown in FIG. 3 and FIG. 4; another radio button embodiment is shown in FIG. 5. The following table summarizes the information indicated by the UI.

| Folder | Reference Emails | Total Emails | Valid Emails | Spam Emails |
|--------|------------------|--------------|--------------|-------------|
| Inbox  | 1, 2, 3          | 3            | 3            | 0           |
| Deleted Items | 4, 5, 6, 7, 8, 9 | 6      | 2            | 4           |

At 206, the user 128 is given an opportunity to input a new value for the user-defined range 106. Since the UI 126 creates the display as if the reference emails 118 were routed to the folders 112 according to their rating 122 and the user-defined range 108, the user 128 can input new values for the user-defined range 108 in the user interface 126 and observe the impact on the folders 112 before the user-defined range 108 is applied to new incoming emails 100. Thus, the user 128 may experiment with the user-defined range 108 until a desired ratio of valid email to spam email per folder 112 is achieved without effecting the incoming stream of emails 100.

Continuing with the example above, at 206, if the user defines a new user-defined range to map ratings 1 to 6 to the Inbox folder and ratings 7 to 9 to the Deleted Items folder, the UI, at 204, will now update the display to indicate that 6 reference emails are routed to the Inbox folder and 3 reference emails are routed to the Deleted Items folder. Additionally, the example display will indicate that there are 5 reference emails labeled "valid" routed to the Inbox folder and 1 reference emails labeled "spam" routed to the Inbox folder; and, 2 reference emails labeled "valid" routed to the Deleted Items folder and 4 reference emails labeled "spam" routed the Deleted Items folder. The following table summarizes the information indicated by the UI after the new user-defined range has been defined:

| Folder | Reference Emails | Total Emails | Valid Emails | Spam Emails |
| --- | --- | --- | --- | --- |
| Inbox | 1, 2, 3, 4, 5, 6 | 6 | 5 | 1 |
| Deleted Items | 7, 8, 9 | 3 | 0 | 0 |

At 208, the user 128 is given an opportunity to update the user-defined range 108 with the new value. At 210, the user-defined range is updated. Once updated, new incoming emails 100 will be routed to folders 112 according to their assigned ratings and the mappings defined by the updated user-defined range 108. At 212, the user 128 exits the UI 126.

In other embodiments, other information filtering objects including documents, RSS feeds, movie reviews, and text messages may be routed. Additionally, in other embodiments, the object may be routed to other destinations. For example, the object may be routed to a routine or a program for further processing instead of to a folder for storage.

FIG. 3 is an exemplary embodiment of a slider-based user interface where emails are rated with an ordinal scale. The stack 300 represents the reference data 116. The 9 horizontal slices within the stack 300 represent the number of reference emails 118 per rating 122. The light shading to the left of line 312 and the dark shading to the right of line 312 within a horizontal slice represent the ratio of valid emails (light shading) to spam emails (dark shading) per rating.

The user 128 manipulates the sliders 302 vertically on the stack 300 with the input device 130 to define the user-defined range 304. In FIG. 3, each slider 302 has nine possible discrete positions. The slider 302A defines the range 304A by mapping ratings 1 to 4 to the Inbox folder. Sliders 302A, 302B define the range 304B by mapping ratings 5 to 8 to the Junk E-mail folder. Sliders 302B, 302C define an empty range 304C by mapping no ratings to the Quarantine folder. Slider 302C defines the range 304D by mapping rating 9 to the Deleted Items folder.

As the user 128 selects new values for the user-defined range by positioning the sliders 302 of the interface, the user 128 will observe the impact on the folders 306 because the number of valid emails 308 and number of spam emails 310 per folder 306 are updated in the display. Thus, the user 128 may experiment with the user-defined range 304 until a desired ratio of valid emails to spam email per folder 306 is achieved without effecting the incoming stream of emails 100.

Once the user 128 is satisfied with the ratio of valid emails 308 to spam email 310 per folder 306, the user may select the OK or Apply button to update the user-defined range. Accordingly, new incoming emails 100 will be routed to folders 112 according to their assigned ratings and the mappings defined by the updated user-defined range 108.

FIG. 4 is an exemplary embodiment of a slider-based user interface where emails are rated with a continuous scale. For example, the rating may take on real number values from 0 to 1, such as 0.5, 0.83, or 1. A 0 rating indicates a high probability that the email is valid and a 1 indicates a high probability that the email is spam. The stack 400 represents the reference data 116. The stack 400 represents the total number of reference emails in increasing order based on the reference email's assigned rating. The light shading to the left of line 402 and the dark shading to the right of line 402 represent the ratio of valid emails (light shading) to spam emails (dark shading).

The user 128 manipulates the sliders 404 vertically on the stack 400 with the input device 130 to define the user-defined range 406. In FIG. 4, each slider 404 may move continuously along the vertical axis of the stack 400. The slider 404A defines the range 406A by mapping rating values above the slider 404A to the Inbox folder 408. Sliders 404A, 404B define the range 406B by mapping values between the slider 404A, 404B to the Junk E-mail folder 408B. Sliders 404B, 404C define an empty range 406C by mapping no ratings to the Quarantine folder 408C. Slider 404C defines the range 406D by mapping rating values below the slider 406D to the Deleted Items folder 408D.

As the user 128 selects new values for the user-defined range by positioning the sliders 404 of the interface, the user 128 will observe the impact on the folders 408 because the number of valid emails 410 and number of spam emails 412 per folder 408 are updated in the display. Thus, the user 128 may experiment with the user-defined range 406 until a desired ratio of valid emails to spam email per folder 408 is achieved without effecting the incoming stream of emails 100.

Once the user 128 is satisfied with the ratio of valid emails 410 to spam email 412 per folder 408, the user may select the OK or Apply button to update the user-defined range. Accordingly, new incoming emails 100 will be routed to folders 112 according to their assigned ratings and the mappings defined by the updated user-defined range 108.

FIG. 5 is an exemplary embodiment of a radio-button-based user interface where documents are rated using an ordinal scale. The stack 500 represents the references data 116. The 9 horizontal slices within the stack 500 represent the number of reference emails 118 per rating 122. The light shading to the left of line 506 and the dark shading to the right of line 506 within a horizontal slice represent the ratio of valid emails (light shading) to spam emails (dark shading) per rating.

The user 128 selects the radio buttons of the display with the input device 130 to define the user-defined range 502. For example, in FIG. 5, the selected radio buttons 502A, 502B, 502C, 502D define the range by mapping ratings 1 to 4 to the Inbox folder 504A. The selected radio buttons 502E, 502F, 502G define the range by mapping ratings 5 to 7 to the Junk folder 504B. The selected radio buttons 502H, 502I define the range by mapping ratings 8 and 9 to the Deleted folder 504D. No radio buttons have been selected to define an empty range by mapping no ratings to the Quarantine folder.

After the user 128 is satisfied with user-defined range defined by the selected radio buttons 502, the user may select the OK or Apply button to update the user-defined range. Accordingly, new incoming emails 100 will be routed to folders 112 according to their assigned ratings and the mappings defined by the updated user-defined range 108.

Referring to FIG. 1, the server 102 typically has at least some form of computer readable media. Computer readable media, which include both volatile and nonvolatile media, removable and non-removable media, may be any available medium that may be accessed by server 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by server 102. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. In the illustrated embodiment, system memory includes read only memory (ROM) and random access memory (RAM).

A user may enter commands and information into server 102 through input devices 130 such as a keyboard and a pointing device (e.g., a mouse, trackball, pen, or touch pad). Other input devices may include a microphone, joystick, game pad, satellite dish, scanner, or the like. A monitor 124 or other type of display device may be connected to the server 102.

The server 102 may operate in a networked environment using logical connections to one or more remote computers, such as a remote computer. The remote computer may be a personal computer, a server, a router, a network PC, a peer device or other common network node, and typically includes many or all of the elements described above relative to server 102. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

When used in a local area networking environment, server 102 is connected to the LAN through a network interface or adapter. When used in a wide area networking environment, server 102 typically includes a modem or other means for establishing communications over the WAN, such as the Internet. The modem, which may be internal or external, is connected to system bus via the user input interface, or other appropriate mechanism. In a networked environment, program modules depicted relative to server 102, or portions thereof, may be stored in a remote memory storage device (not shown). By way of example, and not limitation, FIG. 1 illustrates remote application programs as residing on the memory device. The network connections shown are exemplary and other means of establishing a communications link between the computers may be used.

Although described in connection with an exemplary computing system environment, including server 102, embodiments of the invention are operational with numerous other general purpose or special purpose computing system environments or configurations. The computing system environment is not intended to suggest any limitation as to the scope of use or functionality of any aspect of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
routing incoming objects to mutually exclusive destinations according to rating assigned to each incoming object, wherein a user defines in a user interface on a display of a computing device the mutually exclusive destinations to which incoming objects are routed based on the rating assigned to each incoming object, wherein the mutually exclusive destinations are defined by a plurality of contiguous ranges of the ratings, each range having a lower rating value and an upper rating value, the interface using a set of reference objects, each reference object having an assigned rating corresponding to only one of the destinations and having a user-defined label;
receiving a changed value for a user-defined range from the user interface for routing new incoming objects to each mutually exclusive destination, wherein each incoming object routes to no more than one of the destinations, said user-defined range having a variable upper value and a variable lower value, such that if a user changes a value of the range, a value of a contiguous range is also changed as a result, wherein the receiving comprises allowing a user to move a slider control in the user interface with a selection device in per rating increments on a displayed graph, said graph indicating the number of reference emails per label per rating so that position of the slider defines the changed value for the user-defined range;
in response to receiving the changed value for the user-defined range from the user interface, displaying a total number of reference objects for each destination as if each reference object was routed to one of the mutually exclusive destinations according to their assigned ratings and according to the changed value for the user-defined range, wherein for each particular destination the displaying indicates the number of reference objects having the user-defined label corresponding to the particular destination as if the reference objects were routed to the particular destination, and the number of reference objects having a user-defined label not corresponding to the particular destination as if the reference objects were routed to the particular destination, wherein said displaying indicates the impact the changed value would have had to routing the reference objects;
implementing the plurality of ranges according to the changed values in response to receiving user action from the user interface to implement the changed values, such that future incoming objects are routed according to the implemented ranges;
routing incoming objects to one of the mutually exclusive destinations according to the implemented plurality of ranges.

2. The method of claim 1, wherein the user-defined rating indicates a probability that the object contains at least one of the following: spam, a phishing attack, a virus, and a pharming attack.

3. The method of claim 1, wherein the incoming object is at least one of the following: an email, a document, a RSS feed, a movie review, and a text message.

4. The method of claim 1, wherein the mutually exclusive destinations include first and second destinations wherein ratings within the range are routed to the first destination and wherein ratings outside the range are routed to the second destination.

5. The method of claim 1, wherein each of the mutually exclusive destinations is a folder or a program.

6. A method comprising:
routing incoming emails to mutually exclusive folders according to ratings assigned to each incoming email, wherein a user defines in a user interface mutually exclusive folders to which incoming emails are routed based on a rating assigned to each incoming email, wherein the mutually exclusive folders are defined by a plurality of contiguous ranges of the ratings, each range having a lower rating value and an upper rating value, the interface using a set of reference emails, each reference email having an assigned rating corresponding to only one of the folders and having a user-defined label;
receiving a changed value for a user-defined range from the user interface for routing new incoming emails to each mutually exclusive folder, wherein each incoming email routes to no more than one of the folders, said user-defined range having a variable upper value and a variable lower value, such that if a user changes a value of the range, a value of a contiguous range is also changed as a result, wherein the receiving comprises allowing a user to move a slider control in the user interface with a selection device in per rating increments on a displayed graph, said graph indicating the number of reference emails per label per rating so that position of the slider defines the changed value for the user-defined range;
in response to receiving the changed value for the user-defined range from the user interface, displaying a total number of reference emails for each folder as if each reference email was routed to one of the mutually exclusive folders according to their assigned ratings and according to the changed value for the user-defined range, wherein for each particular folder the displaying indicates the number of reference emails having the user-defined label corresponding to the particular folder as if the reference emails were routed to the particular folder, and the number of reference emails having a user-defined label not corresponding to the particular folder as if the reference emails were routed to the particular folder, wherein said displaying indicates the impact the changed value would have had to routing the reference emails;

implementing the plurality of ranges according to the changed values in response to receiving user action from the user interface to implement the changed values, such that future incoming emails are routed according to the implemented ranges;

routing incoming emails to one of the mutually exclusive folders according to the implemented plurality of ranges.

7. The method of claim 6, wherein the mutually exclusive folders include first, second and third folders.

8. The method of claim 7, wherein the first mutually exclusive folder is an inbox folder, the second mutually exclusive folder is a junk email folder, the third mutually exclusive folder is a deleted email folder, and wherein emails routed to the first folder indicate a low probability that the email contains spam, emails routed to the second folder indicate a medium probability that the email contains spam, and emails routed to the third folder indicate a high probability that the email contains spam.

9. The method of claim 6, wherein the mutually exclusive folders include at least one of the following: an inbox folder, a junk email folder, a deleted email folder, and a quarantine folder.

10. The method of claim 6, wherein the assigned rating indicates a probability that the email contains at least one of the following: spam, a phishing attack, a virus, and a pharming attack.

11. The method of claim 6, wherein the user-defined label indicates that the reference email contains at least one of the following: spam, a phishing attack, a virus, and a pharming attack.

12. The method of claim 6, wherein one or more computer-readable media have computer-executable instructions for performing the method of claim 6.

13. A system for assisting a user in defining mutually exclusive folders, said system comprising:

a reference set of emails, wherein each reference email has an assigned rating and each reference email having either an inbox label or a spam label; and a processor for executing computer-executable instructions for:

routing incoming emails to mutually exclusive folders according to ratings assigned to each incoming email, wherein a user defines in a user interface mutually exclusive folders to which incoming emails are routed based on a rating assigned to each incoming email, wherein the mutually exclusive destinations are defined by a plurality of contiguous ranges of the ratings, each range having a lower rating value and an upper rating value, wherein the mutually exclusive folders include at least an inbox folder and a spam folder to which emails are routed based on a rating assigned to each incoming email;

receiving a changed value for a user-defined range from the user interface for routing new incoming emails to each mutually exclusive folder, wherein each incoming email routes to no more than one of the mutually exclusive folders according to said range, wherein the receiving comprises allowing a user to move a slider control in the user interface with a selection device in per rating increments on a displayed graph, said graph indicating the number of reference emails per label per rating so that position of the slider defines the changed value for the user-defined range; and in response to receiving the changed value for the user-defined range from the user interface, displaying a total number of reference emails for each folder as if each reference email was routed to one of the mutually exclusive folders according to their assigned ratings and according to the changed value for the user-defined range, said displaying indicating the number of reference emails which would be routed to the inbox folder having the inbox label, and the number of reference emails which would be routed to the inbox folder having the spam label, said displaying further indicating the impact the chanced value would have had to the number of reference emails which would be routed to the spam folder having the inbox label, and the impact the changed value would have had to the number of reference emails which would be routed to the spam folder having the spam label;

implementing the plurality of ranges according to the changed values in response to receiving user action from the user interface to implement the changed values, such that future incoming objects are routed according to the implemented ranges;

routing incoming objects to one of the mutually exclusive destinations according to the implemented plurality of ranges.

14. The system of claim 13, wherein emails with ratings within the changed value for the user-defined range are routed to the inbox folder and emails with ratings outside the range are routed to the spam folder.

15. The system of claim 13, wherein the rating indicates a probability that the incoming email contains at least one of the following: spam, a phishing attack, a virus, and a pharming attack.

16. The system of claim 13, wherein the rating is based on at least one of the following: a continuous scale and an ordinal scale.

17. The system of claim 13, wherein the wherein a variable user-defined range is defined by a radio button control wherein the selection of the radio button indicates that emails with the particular rating are to be routed to the corresponding folder.

* * * * *